G. L. LAKE.
ANIMAL SMOKER.
APPLICATION FILED FEB. 14, 1914.

1,117,063.

Patented Nov. 10, 1914.

Witnesses
Stuart Hilder.
Frances W. Anderson.

Inventor
George L. Lake
By E. W. Anderson & Son
Attorneys

THE NORRIS PETERS CO., PHOTO-LITHO., WASHINGTON, D. C.

UNITED STATES PATENT OFFICE.

GEORGE L. LAKE, OF CHILHOWEE, MISSOURI.

ANIMAL-SMOKER.

1,117,063.  Specification of Letters Patent. Patented Nov. 10, 1914.

Application filed February 14, 1914. Serial No. 818,671.

*To all whom it may concern:*

Be it known that I, GEORGE L. LAKE, a citizen of the United States, resident of Chilhowee, in the county of Johnson and State of Missouri, have made a certain new and useful Invention in Animal-Smokers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
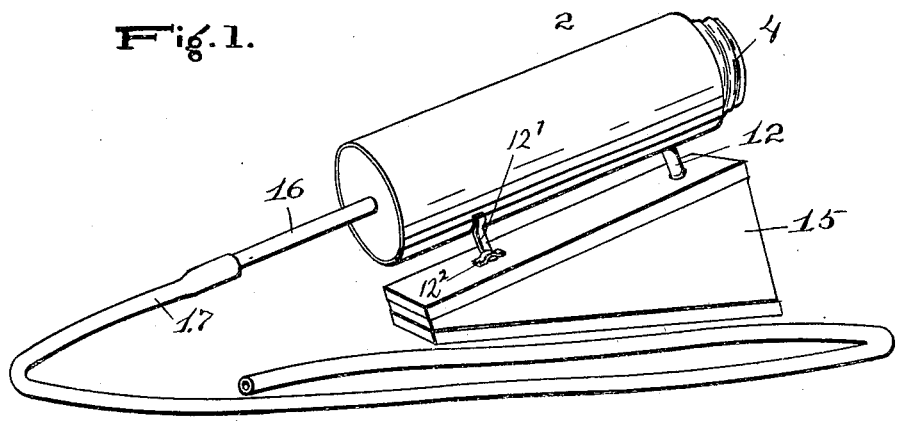
Figure 2:
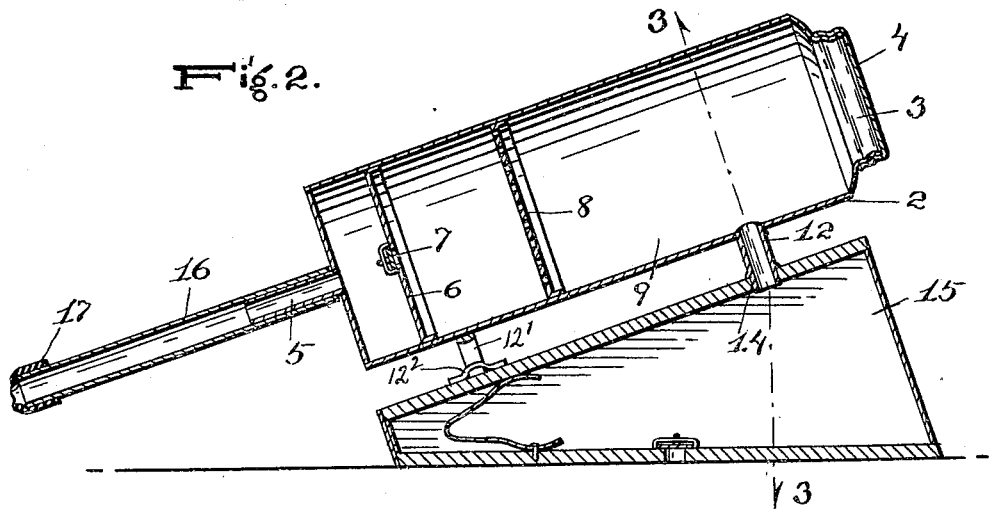
Figure 3:
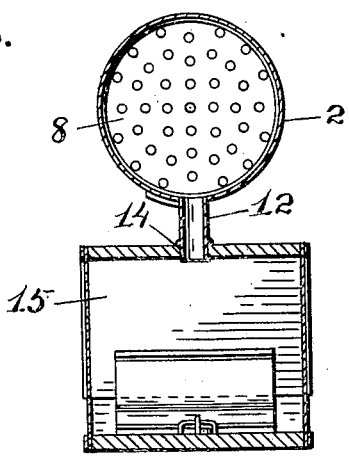
Figure 4:
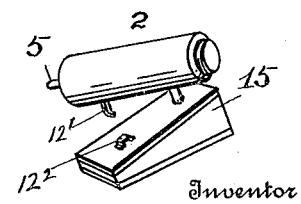

Figure 1 is a perspective view of the invention. Fig. 2 is a central longitudinal section of the same. Fig. 3 is a section on the line 3—3, Fig. 2. Fig. 4 is a perspective view of the invention on a smaller scale with the vessel turned to one side upon the tube as a pivot.

The object of the invention is to provide an improved animal smoker, or device for smoking animals out of holes, burrows and caves; and the invention consists in the novel construction and combination of parts, as hereinafter set forth.

In the accompanying drawings, the numeral 2, indicates a receiving vessel for the fuel or material to be used to produce the smoke. This vessel is designed to be strongly made of metal and to have an opening 3, at one end, provided with a projecting threaded wall to receive a screw cap or cover 4, whereby it may be tightly closed. At its other end is a small projecting discharge nozzle 5.

Within the receiver 2, near its discharge end, is provided a diaphragm 6, having a backward closing valve 7. In rear of this diaphragm is located a perforated guard diaphragm 8, which will operate to prevent ashes and debris in the burning or fuel compartment 9, from being forced against and clogging the valve 7. From the wall of the fuel compartment 9, projects a short strong tube 12, which is designed to engage an aperture seat 14, of the bellows wall, and yet to be removable therefrom. The bellows 15, is usually made of about the same length and width as the receiving vessel, this length being such that, as the tube 12, is the only connection between them, one can be detached from the other and both placed in the pocket. A cooling tube 16, of about the length of the receiving vessel is also provided, said tube being designed to engage the discharge nozzle 5, and to be removable therefrom. To the end of the cooling tube a length of rubber tube or hose 17, is to be connected, and is designed to serve to carry the smoke into the hole or burrow of the animal far enough to drive it out, without affecting the entrance to the hole or hiding place sufficiently to prevent efficient action in catching the animal in its efforts to escape.

The receiving vessel is made air tight so as to prevent the escape of smoke, except as provided for, the screw cover to the opening in the fuel compartment being an effective feature in this connection. And in order to prevent cracks in the rubber hose liable to occur in a very short time when exposed to undue heat, the cooling tube is used as described, between the smoke making receptacle and the hose. This tube is also serviceable as a means for manipulating the hose, especially when the entrance to the hole or cave of the animal is small.

By operating the bellows, air is forced into the fuel receptacle, to burn the material and cause the smoke to be pressed through the perforations of the inner diaphragm, and through the valve of the diaphragm next the end of said receiver, into and through the cooling tube and hose.

A bracing and connecting means between the vessel and the bellows is preferably provided at the opposite end of the device to that at which the tube 12 is located, said means consisting usually of a bar 12' secured to the vessel 2, said bar having a foot which is removably turned into engagement with a seat of a bracket $12^2$ of the bellows when the part 2 is pivotally moved upon tube 12 as a center.

I claim:

1. In an animal smoker, a receiver having at one end a threaded opening and screw cap, and at the other end a projecting discharge nozzle, an interior valved diaphragm near the discharge end, and a perforated diaphragm in rear of the valved diaphragm, a rubber hose, and a removable cooling tube between said hose and said receiver in connection with the discharge nozzle.

2. In an animal smoker, a bellows having an aperture seat in its wall, a receiving vessel having a tubular projection detachably engaging said seat, an interior valved diaphragm, a perforated guard diaphragm, and a projecting discharge nozzle, a length of rubber hose, and a detachable cooling tube between and connected to the hose and the discharge nozzle.

3. In an animal smoker, a fuel receiver having a discharge nozzle, a rubber hose, a cooling tube between and connected to said nozzle and hose, an interior diaphragm near the discharge end, having a backward closing valve, and an interior perforated diaphragm in rear of and guarding the valved diaphragm.

4. In an animal smoker, a bellows having an aperture seat in its wall, a receiving vessel having a tubular projection detachably and pivotally engaging said seat, an interior valved diaphragm, a perforated guard diaphragm, and a projecting discharge nozzle, said vessel having also a brace detachably engaging a seat of the bellows, a length of rubber hose, and a detachable cooling tube between and connected to the hose and the discharge nozzle.

In testimony whereof I affix my signature, in presence of two witnesses.

GEORGE L. LAKE.

Witnesses:
A. N. MOORE,
J. L. HOLLAND.

Copies of this patent may be obtained for five cents each, by addressing the "Commissioner of Patents, Washington, D. C."